United States Patent
Lohrentz

(10) Patent No.: US 12,356,891 B2
(45) Date of Patent: Jul. 15, 2025

(54) ROTATABLE WING DIVIDERS, HARVESTING HEADERS, AND AGRICULTURAL MACHINES HAVING ROTATABLE WING DIVIDERS

(71) Applicant: AGCO Corporation, Duluth, GA (US)

(72) Inventor: Randall Lohrentz, Buhler, KS (US)

(73) Assignee: AGCO Corporation, Duluth, GA (US)

( * ) Notice: Subject to any disclaimer, the term of this patent is extended or adjusted under 35 U.S.C. 154(b) by 634 days.

(21) Appl. No.: 17/637,409

(22) PCT Filed: May 26, 2020

(86) PCT No.: PCT/IB2020/054954
§ 371 (c)(1),
(2) Date: Feb. 22, 2022

(87) PCT Pub. No.: WO2021/038314
PCT Pub. Date: Mar. 4, 2021

(65) Prior Publication Data
US 2022/0279723 A1 Sep. 8, 2022

Related U.S. Application Data

(60) Provisional application No. 62/890,654, filed on Aug. 23, 2019.

(51) Int. Cl.
*A01D 63/02* (2006.01)
*A01D 63/04* (2006.01)
*A01D 65/00* (2006.01)

(52) U.S. Cl.
CPC ............. *A01D 63/02* (2013.01); *A01D 63/04* (2013.01); *A01D 65/00* (2013.01)

(58) Field of Classification Search
CPC ......... A01D 65/00–65/08; A01D 63/00–63/04
See application file for complete search history.

(56) References Cited

U.S. PATENT DOCUMENTS 700,029 A * 5/1902 Gatermann ............ A01D 65/02
56/313
703,497 A * 7/1902 Steward ................. A01D 63/04
56/319
(Continued)

FOREIGN PATENT DOCUMENTS

BE 438466 A 4/1940
EP 2380428 A2 10/2011
(Continued)

OTHER PUBLICATIONS

UK Intellectual Property Office, Search Report for related UK Patent Application No. GB1913034.3 dated Feb. 27, 2020.
(Continued)

*Primary Examiner* — Christopher J Sebesta
*Assistant Examiner* — Madeline I Runco
(74) *Attorney, Agent, or Firm* — Jeffrey S. Ellsworth

(57) ABSTRACT

An apparatus for dividing crops includes a support shaft (302) configured to be received by a fixed divider (206) of a harvesting header, a rotatable wing divider (300) coupled to the support shaft (302) at a pivot point (314), and a torsional biasing element configured to apply a biasing rotational force to the wing divider (300) relative to the support shaft (302). A harvesting header (200) includes a header frame (202), a first divider assembly, a second divider assembly, and at least one harvesting tool (204). The divider assemblies each include a fixed divider (206), a support shaft (302) carried by the fixed divider, a rotatable wing divider (300) coupled to the support shaft at a pivot point (314), and a torsional biasing element configured to apply a biasing rotational force to the wing divider (300) relative to the support shaft (302).

18 Claims, 5 Drawing Sheets

(56) References Cited

U.S. PATENT DOCUMENTS

| | | | |
|---|---|---|---|
| 1,123,632 A * | 1/1915 | Weisgarber | A01D 65/02 56/313 |
| 1,859,208 A | 5/1932 | Kane | |
| 1,882,875 A | 10/1932 | Pierson | |
| 2,141,299 A * | 12/1938 | Hume | A01D 65/02 56/313 |
| 2,689,755 A | 9/1954 | Krotz | |
| 2,892,298 A * | 6/1959 | Chaney | A01D 65/02 56/314 |
| 3,313,095 A * | 4/1967 | Gaterman | A01D 34/14 56/312 |
| 4,887,419 A * | 12/1989 | Bouin | A01D 65/02 56/319 |
| 5,788,265 A | 8/1998 | McLaughlin | |
| 5,906,091 A * | 5/1999 | Gemar | A01D 65/00 56/307 |
| 6,244,026 B1 * | 6/2001 | Minnihan | A01D 65/02 56/119 |
| 8,037,573 B2 | 10/2011 | Bost, Jr. | |
| 8,141,331 B2 * | 3/2012 | Bich | A01D 63/04 56/15.8 |
| 8,991,145 B2 * | 3/2015 | Dietrich | A01D 65/02 56/312 |
| 2014/0083074 A1 | 3/2014 | Kiel et al. | |
| 2016/0150731 A1 * | 6/2016 | Dietrich | A01D 65/00 56/320.1 |

FOREIGN PATENT DOCUMENTS

| | | | | |
|---|---|---|---|---|
| FR | 467083 A | * | 6/1914 | |
| FR | 2734120 A1 | * | 11/1996 | A01D 65/02 |
| GB | 2208581 A | * | 4/1989 | A01D 65/00 |

OTHER PUBLICATIONS

European Patent Office, International Search Report for related International Patent Application No. PCT/IB2020/054954, mail date Sep. 14, 2020.

* cited by examiner

ROTATABLE WING DIVIDERS, HARVESTING HEADERS, AND AGRICULTURAL MACHINES HAVING ROTATABLE WING DIVIDERS

CROSS-REFERENCE TO RELATED APPLICATION

This application claims the benefit of the filing date of U.S. Provisional Patent Application 62/890,654, "Rotatable Wing Dividers, Harvesting Headers, and Agricultural Machines Having Rotatable Wing Dividers," filed Aug. 23, 2019, the entire disclosure of which is incorporated herein by reference.

FIELD

This disclosure relates to harvesting headers for use with self-propelled crop-harvesting machines, and particularly to fixed dividers and rotatable wing dividers.

BACKGROUND

Self-propelled agricultural harvesters are well known and include, by way of example, combine harvesters, windrowers, and forage harvesters, all of which typically include a frame or chassis, an operator cab, an engine, and ground-engaging wheels or tracks. A cutting or pick-up header is often carried by the harvester, the header typically being considerably wider than the harvester and mounted to the front side of a feederhouse.

Crop material collected by the header is conveyed into the feederhouse before being conveyed in a generally rearward direction to crop-processing apparatus. In the case of a combine harvester, the processing apparatus serves to thresh the crop material and separate grain therefrom, whereas, in the case of a forage harvester or windrower, the crop material is typically passed through conditioning rollers.

Headers typically include a pair of crop dividers on opposite ends of a crop-gathering mechanism. The dividers divide and lift the crop, and guide it inwardly toward the crop-gathering mechanism, where it may be harvested by one or more harvesting tools, such as a set of oscillating blades. Dividers may carry divider points, which may extend forward or upward from the front of the divider. The divider points may be of various designs, depending on the crop to be harvested. Some divider points may extend well in front of the header, and may contact the ground in certain terrain (e.g., hilly, rough, etc.). Contact between the divider point and the ground may cause damage to the divider point and/or the ground.

BRIEF SUMMARY

An apparatus for dividing crops includes a support shaft configured to be received by a fixed divider of a harvesting header, a rotatable wing divider coupled to the support shaft at a pivot point, and a torsional biasing element configured to apply a biasing rotational force to the wing divider relative to the support shaft.

A harvesting header for use with a crop-harvesting machine includes a header frame structured to be coupled to the crop-harvesting machine, a first divider assembly at a first end of the header frame, and a second divider assembly at a second end of the header frame opposite the first end. Each of the first divider assembly and the second divider assembly includes a fixed divider, a support shaft carried by the fixed divider, a rotatable wing divider coupled to the support shaft at a pivot point, and a torsional biasing element configured to apply a biasing rotational force to the wing divider relative to the support shaft. The harvesting header also includes at least one harvesting tool carried by the header frame between the first divider assembly and the second divider assembly.

An agricultural harvester includes a chassis, a feederhouse carried by the chassis, a processing system carried by the chassis and structured to receive crop material from the feederhouse, a grain bin carried by the chassis and structured to receive processed grain from the processing system, and a harvesting header coupled to the feederhouse and configured to cut grain. The harvesting header includes a header frame, a first divider assembly at a first end of the header frame, and a second divider assembly at a second end of the header frame opposite the first end. Each of the first divider assembly and the second divider assembly includes a fixed divider, a support shaft carried by the fixed divider, a rotatable wing divider coupled to the support shaft at a pivot point, and a torsional biasing element configured to apply a biasing rotational force to the wing divider relative to the support shaft. The harvesting header also includes at least one harvesting tool carried by the header frame between the first divider assembly and the second divider assembly.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
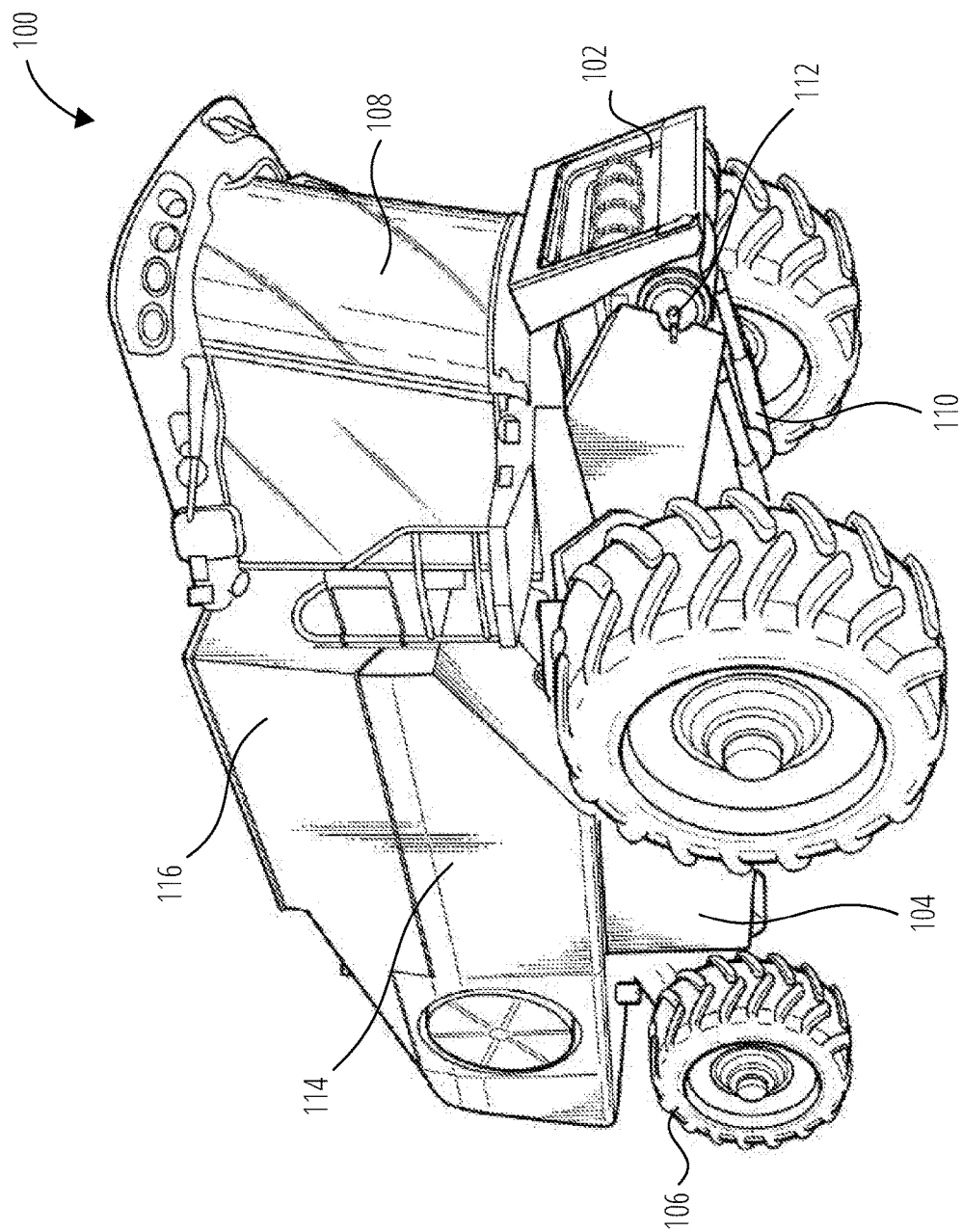
FIG. 1 is a simplified front perspective view of an example combine harvester.

The illustrations presented herein are not actual views of any header or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

FIG. 1 illustrates an example agricultural harvester embodied as a combine harvester 100. In the context of the present disclosure, the example combine harvester 100 is merely illustrative, and other machines and/or implements with like functionality may deploy certain embodiments disclosed herein, such as windrowers, forage harvesters, etc. The example combine harvester 100 is shown in FIG. 1 without a header attached, and includes a feederhouse 102 carried by a chassis 104 supported by wheels 106. An operator cab 108 is mounted to the chassis 104. In some embodiments, other or additional forms of travel may be used, such as tracks. Hydraulic cylinders 110 are shown affixed to the underside of the feederhouse 102 on one end and to the chassis 104 on the other end. The feederhouse 102 may move (e.g., up and down, pitch, tilt, etc.) based on actuation of the hydraulic cylinders 110, which causes a detachably coupled header to also be raised, lowered, pitched, and/or tilted. A rotating support shaft 112 may be configured to provide mechanical power to a header during operation of the combine harvester 100. The rotating support shaft 112 may be configured to operate at various speeds, as described in, for example, U.S. Pat. No. 9,434,252, "Power Takeoff Drive System for a Vehicle," issued Sep. 6, 2016.

In general, the combine harvester 100 cuts crop materials (e.g., using the header), and the cut crop materials are delivered to the front end of the feederhouse assembly 200. Such crop materials move upwardly and rearwardly within and beyond the feederhouse 102 (e.g., by a conveyer) until reaching a processing system 114 that includes a thresher rotor. In one embodiment, the thresher rotor may comprise a single, transverse rotor, such as that found in a Gleaner® Super Series Combine by AGCO. Other designs may be used, such as axial-based, twin rotor, or hybrid designs. The thresher rotor processes the crop materials in known manner and passes a portion of the crop material (e.g., heavier chaff, corn stalks, etc.) toward the rear of the combine harvester 100 and another portion (e.g., grain and possibly light chaff) through a cleaning process. In the processing system 114, the crop materials undergo threshing and separating operations. In other words, the crop materials are threshed and separated by the thresher rotor operating in cooperation with well-known foraminous processing members in the form of threshing concave assemblies and separator grate assemblies, with the grain (and possibly light chaff) escaping through the concave assemblies and the grate assemblies and to a cleaning system beneath the processor to facilitate the cleaning of the heavier crop material. Bulkier stalk and leaf materials are generally retained by the concave assemblies and the grate assemblies and are discharged out from the processing system 114 and ultimately out of the rear of the combine harvester 100. The cleaned grain that drops to the bottom of the cleaning system is delivered by a conveying mechanism that transports the grain to an elevator, which conveys the grain to a grain bin 116 located at the top of the combine harvester 100. Any remaining chaff and partially or unthreshed grain is recirculated through the processing system 114 via a tailings return conveying mechanism. Because combine processing is known to those having ordinary skill in the art, further discussion thereof is omitted here for brevity. In embodiments in which the agricultural harvester is a windrower or forage harvester, the processing system 114 may include conditioning rollers rather than separation devices.

Figure 2:
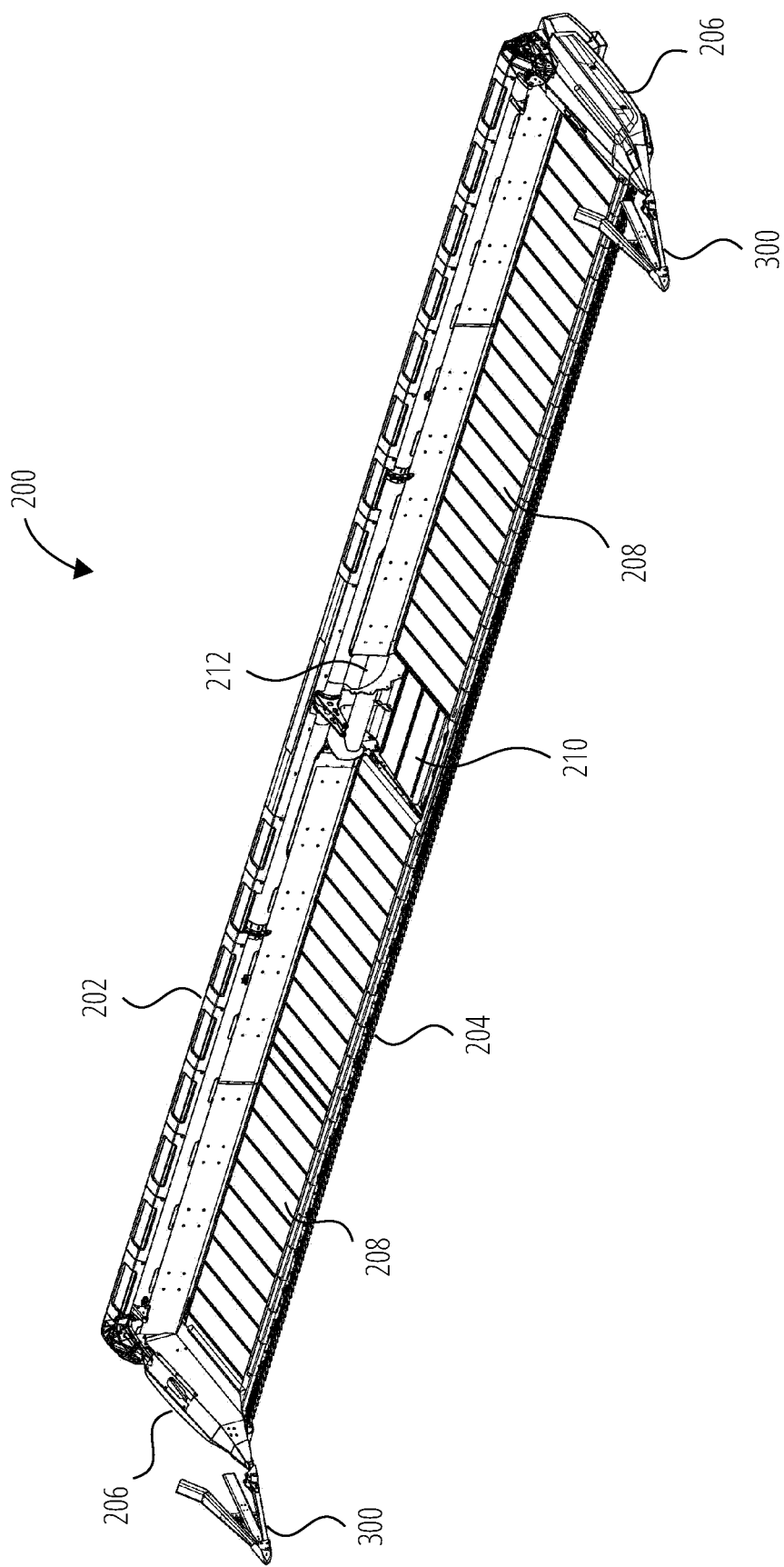
FIG. 2 illustrates a header that may be used with combine harvester of FIG. 1.

FIG. 2 is a simplified view of a header 200 that may be attached to the feederhouse 102 of the combine harvester 100 (FIG. 1) and used to harvest a crop. The header 200 includes a header frame 202, at least one harvesting tool 204, and fixed dividers 206 at either end of the header 200. The harvesting tool 204 is depicted as an oscillating blade, but may be any other tool used for harvesting crops that come into contact with the harvesting tool 204. The fixed dividers 206 may serve to define boundaries between crop material being harvested and standing crop (typically, material to be harvested in a subsequent pass through the field) by directing crop material on one side of the fixed divider 206 toward the harvesting tool 204 and crop material on the other side of the fixed divider 206 away from the harvesting tool 204.

Wing dividers 300 may be coupled to and carried by each of the fixed dividers 206, and may extend forward from the fixed dividers 206.

The header 200 may also include side drapers 208, a center draper 210, and/or a collecting auger 212 that together may transport cut crop material toward the feederhouse 102 of the combine harvester 100. Headers are described in more detail in, for example, U.S. Pat. No. 7,886,511, "Draper Head with Flexible Cutterbar Having Rigid Center Section," issued Feb. 15, 2011; U.S. Pat. No. 10,194,588, "Corn Header Configured to Reduce Kernel Losses," issued Feb. 5, 2019; and U.S. Pat. No. 8,857,143, "Frame for Harvesting Header with Continuous Section," issued Oct. 14, 2014.

Figure 3:
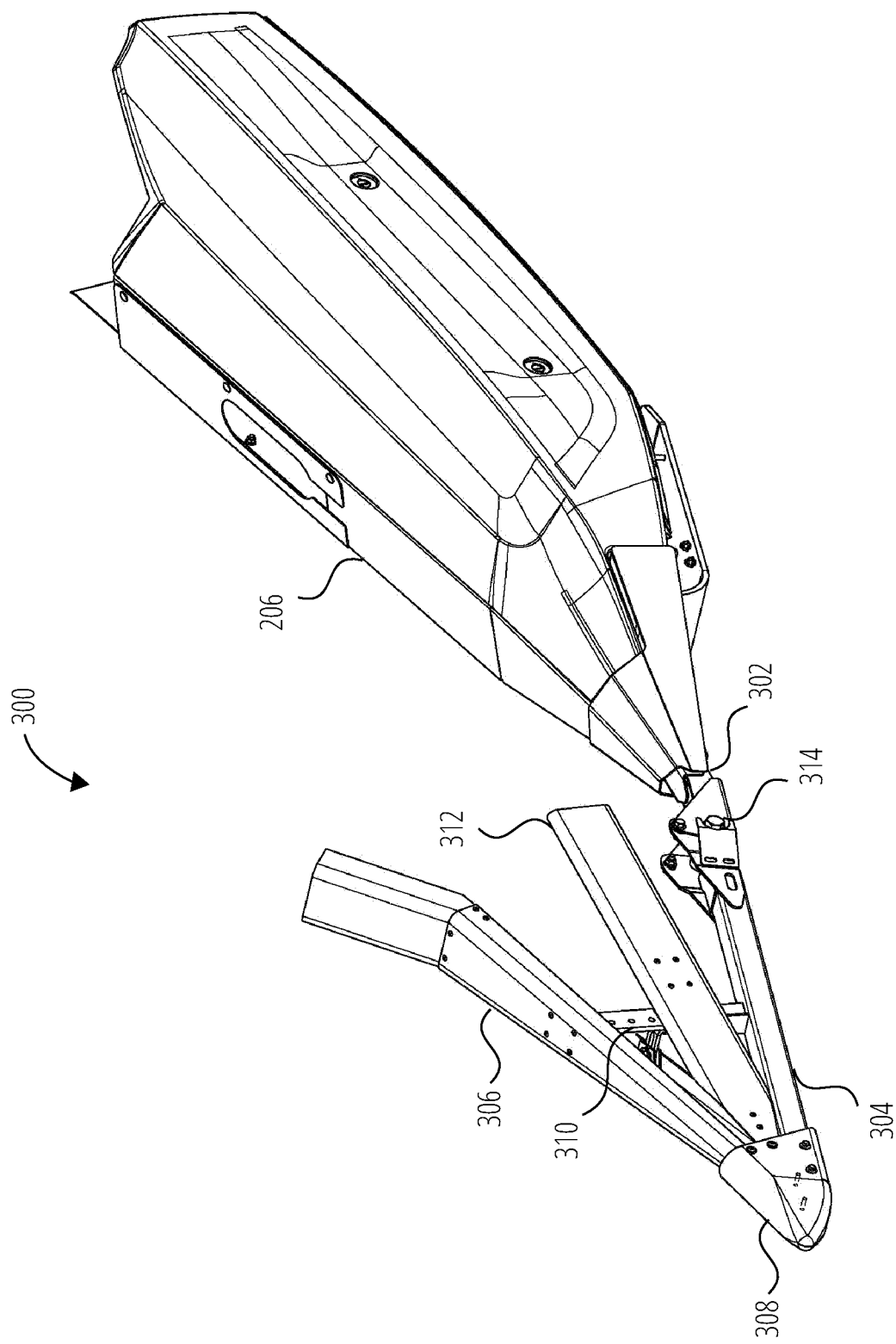
FIG. 3 is a simplified perspective view of a fixed divider of the header shown in FIG. 2 and a wing divider that may be attached to the fixed divider.

FIG. 3 is a simplified perspective view showing more detail of one fixed divider 206 and one wing divider 300 of the header 200 shown in FIG. 2, which may together be referred to as a divider assembly. The wing divider 300 may be coupled to a support shaft 302, which may in turn be secured to the fixed divider 206. For example, the support shaft 302 may include a generally straight portion affixed to the fixed divider 206 by a spring and latch, as described in U.S. Provisional Patent Application 62/878,042, "Divider Points, Harvesting Headers Configured to Receive Removable Divider Points, and Related Methods," filed Jul. 24, 2019. In other embodiments, the support shaft 302 may be secured to the fixed divider 206 by bolts.

The wing divider 300 may include a lower member 304, an upper member 306, and a divider tip 308 secured to the lower member 304 and the upper member 306. A brace 310 and center support 312 may also structurally support the relative positions of the lower member 304 and the upper member 306 to maintain an orientation of the upper member 306 in relation to the lower member 304. That is, the lower member 304, the upper member 306, the divider tip 308, the brace 310, and the center support 312 of the wing divider 300 may move together as a unit. In some embodiments, one or more of these elements may be omitted. In other embodiments, one or more of these elements may be combined into a single unitary part. The parts of the wing divider 300 may be designed and arranged to divide crop material and direct crop material to be harvested toward the harvesting tool 204.

The wing divider 300 may be coupled to the support shaft 302 at a pivot point 314. For example, and as depicted in FIG. 3, the lower member 304 of the wing divider 300 is arranged to pivot about the pivot point 314. The pivot point 314 may include a torsional biasing element configured to apply a biasing force to rotate the wing divider 300 relative to the support shaft 302. For example, the pivot point 314 may include a torsional biasing element (e.g., a bushing) having two concentric cylinders with an elastomeric material between. One of the cylinders may be connected to the support shaft 302, and the other may be connected to the wing divider 300. The elastomeric material may permit the cylinders to move relative to one another, but may tend to urge the cylinders toward a particular orientation. Such torsional biasing elements are described in more detail in U.S. Pat. No. 2,689,755, "Resilient Bushing and Method of Making Same," issued Sep. 21, 1954; U.S. Pat. No. 5,788,265, "Torsional Bushing System," issued Aug. 4, 1988; and U.S. Pat. No. 8,037,573, "Curled Bushing with Torsional Slip," issued Oct. 18, 2011.

In other embodiments, the torsional biasing element may include a coil spring, such as described in U.S. Pat. No. 4,886,484, "Torsional Spring Tensioner with Stabilizer," issued Dec. 12, 1989.

Figure 4:
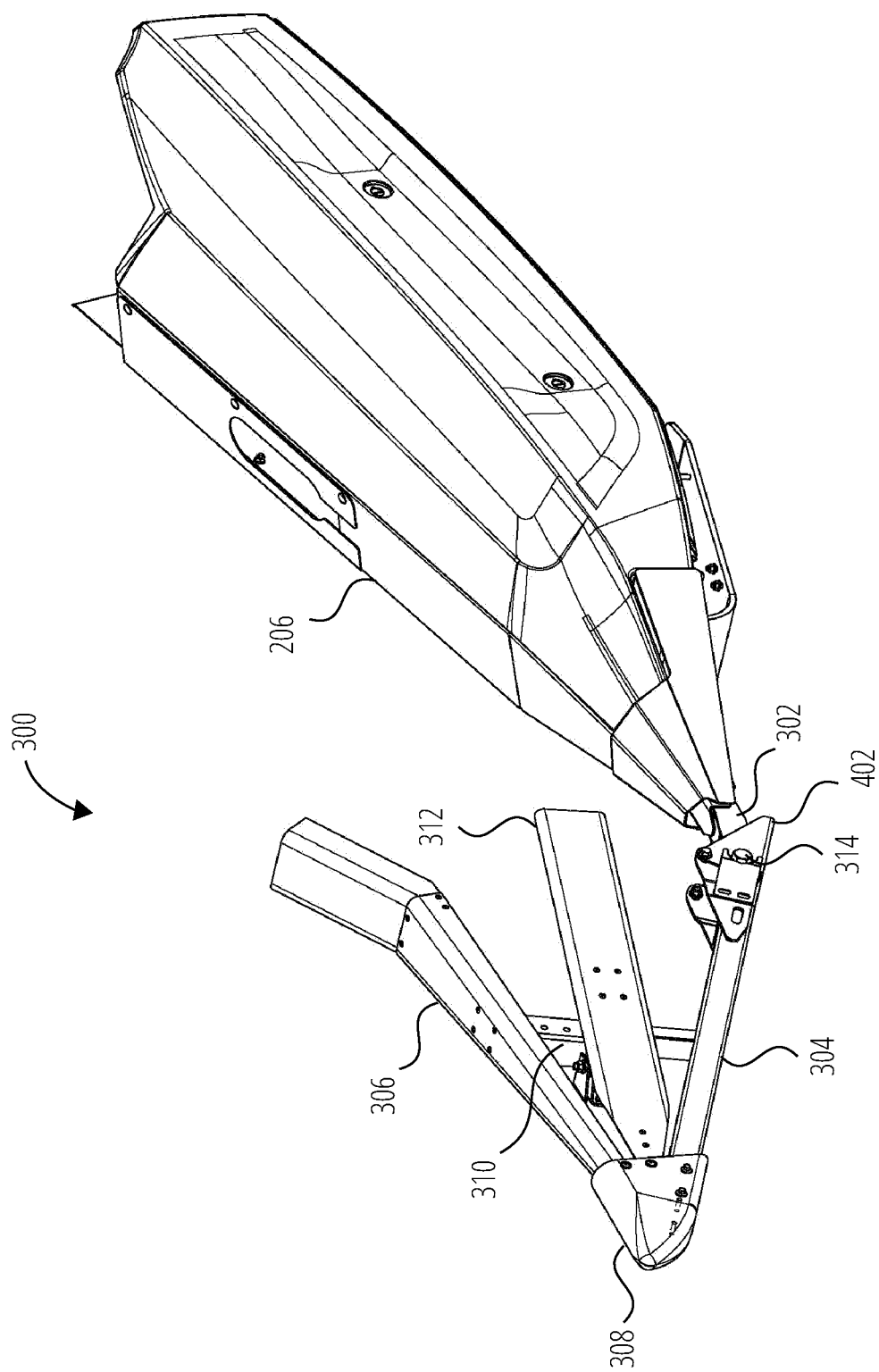
FIG. 4 is a simplified perspective view of the wing divider of FIG. 3 in another position with respect to the fixed divider.

FIG. 4 is a simplified perspective view of the fixed divider 206 and the wing divider 300 in another position. In particular, the wing divider 300 is rotated upward in the view shown in FIG. 4 as compared to the view shown in FIG. 3. The wing divider 300 may include features to prevent movement past selected limits. For example, a stop 402 may be rigidly coupled to the lower member 304, and may prevent the wing divider 300 from rotating downward beyond a preselected angle. As pictured, the stop 402 may include a planar member that abuts the support shaft 302 when the lower member 304 is collinear with the support shaft 302 (e.g., when a longitudinal axis of the lower member 304 is aligned with a longitudinal axis of the support shaft 302, or when a lower surface of the lower member 304 is in a common plane with a lower surface of the support shaft 302).

Figure 5:
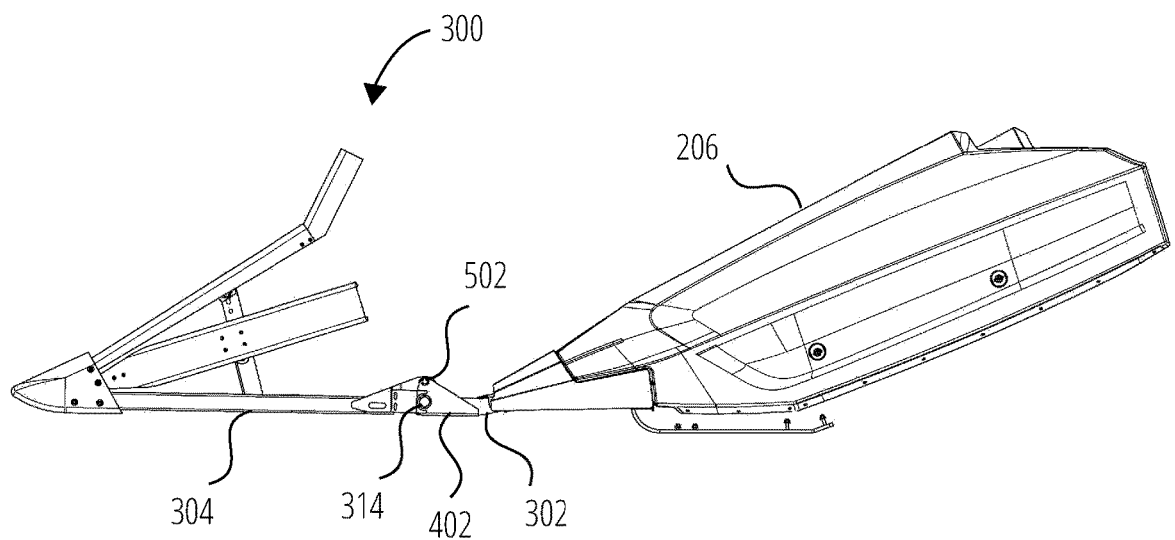
FIG. 5 is a simplified side view of the fixed divider and the wing divider in the position shown in FIG. 3.
Figure 6:
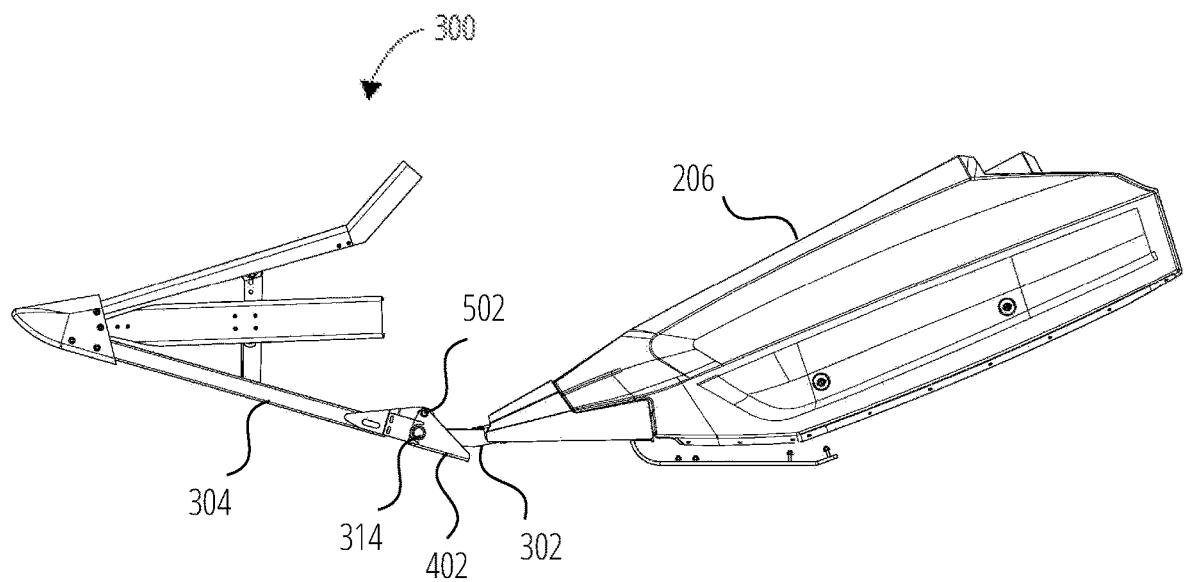
FIG. 6 is a simplified side view of the fixed divider and the wing divider in the position shown in FIG. 4.

FIG. 5 is a side view of the fixed divider 206 and the wing divider 300 in the position depicted in FIG. 3, and FIG. 6 shows the wing divider 300 in the position depicted in FIG. 4. As shown, the stop 402 may rest against the support shaft 302 in the position shown in FIG. 5. The support shaft 302 or the lower member 304 may carry a pin 502, and a corresponding slot may be formed in the lower member 304 or the support shaft 302, such that when the lower member 304 rotates about the pivot point 314, the pin 502 slides in the slot. The slot may be adjusted to set the maximum upward travel of the wing divider 300. The torsional biasing element at the pivot point 314 may tend to keep the wing divider 300 in the lowered position, shown in FIG. 5, absent an external upward force on the wing divider 300.

The wing divider 300 and associated elements disclosed herein may be used to cause the wing divider 300 to rise when it contacts the ground in use on a header 200. Typically, if a wing divider contacts the ground, the ground and/or the wing divider may be damaged. To avoid this problem, the height of a conventional wing divider may typically be set high enough to avoid ground contact.

However, the wing divider 300 shown and described herein can simply rotate upward, potentially avoiding damage to the wing divider 300 or the ground. Thus, the wing divider 300 may be set to travel closer to the ground surface than conventional wing dividers in similar field conditions, and yet avoid damage. The torsional biasing element helps to lower the wing divider 300 after the terrain that caused the ground contact to keep the wing divider 300 close to the ground. The torsional biasing element may also provide a downward force on the wing divider 300, such that minor obstructions (e.g., dense crop material) do not rotate the wing divider 300 upward. The pin 502 and slot provides the operator with an adjustment to limit the maximum upward travel of the wing divider 300.

Additional non-limiting example embodiments of the disclosure are described below.

Embodiment 1: An apparatus for dividing crops, comprising a support shaft configured to be received by a fixed divider of a harvesting header, a rotatable wing divider coupled to the support shaft at a pivot point, and a torsional biasing element configured to apply a biasing rotational force to the wing divider relative to the support shaft.

Embodiment 2: The apparatus of Embodiment 1, wherein the wing divider comprises an upper member, a lower member, and a divider tip secured to the upper member and the lower member.

Embodiment 3: The apparatus of Embodiment 2, wherein the wing divider further comprises a brace and a center support configured to maintain an orientation of the upper member relative to the lower member.

Embodiment 4: The apparatus of Embodiment 3, wherein the wing divider is coupled to the support shaft by the lower member of the wing divider.

Embodiment 5: The apparatus of any one of Embodiment 1 through Embodiment 4, wherein the wing divider comprises a stop configured to prevent rotation of the wing divider past a selected downward angle relative to the support shaft.

Embodiment 6: The apparatus of Embodiment 5, wherein the torsional biasing element pushes the wing divider downward when the wing divider is at an angle above the selected downward angle.

Embodiment 7: The apparatus of Embodiment 5 or Embodiment 6, wherein at the selected downward angle, a lower member of the wing divider is collinear with the support shaft.

Embodiment 8: The apparatus of any one of Embodiment 1 through Embodiment 7, wherein at least one of the wing divider and the support shaft defines a slot, and further comprising a pin disposed within the slot, wherein rotation of the wing divider causes the pin to slide relative to the slot.

Embodiment 9: The apparatus of Embodiment 8, wherein the pin is configured to limit rotation of the wing divider past a selected upward angle relative to the support shaft.

Embodiment 10: The apparatus of Embodiment 9, wherein the torsional biasing element pushes the wing divider downward from the upward angle.

Embodiment 11: The apparatus of any one of Embodiment 1 through Embodiment 10, wherein the support shaft has a generally straight portion.

Embodiment 12: The apparatus of any one of Embodiment 1 through Embodiment 11, wherein the torsional biasing element comprises an elastomeric material.

Embodiment 13: A harvesting header for use with a crop-harvesting machine, the harvesting header comprising a header frame structured to be coupled to the crop-harvesting machine, a first divider assembly at a first end of the header frame, and a second divider assembly at a second end of the header frame opposite the first end. Each of the first divider assembly and the second divider assembly comprises a fixed divider, a support shaft carried by the fixed divider, a rotatable wing divider coupled to the support shaft at a pivot point, and a torsional biasing element configured to apply a biasing rotational force to the wing divider relative to the support shaft. The harvesting header further comprises at least one harvesting tool carried by the header frame between the first divider assembly and the second divider assembly.

Embodiment 14: The harvesting header of Embodiment 13, wherein each wing divider comprises a stop configured to prevent rotation of the wing divider past a selected downward angle relative to the support shaft.

Embodiment 15: The harvesting header of Embodiment 13 or Embodiment 14, wherein at least one of the wing divider and the support shaft defines a slot, and further comprising a pin disposed within the slot, wherein rotation of the wing divider causes the pin to slide relative to the slot, wherein the pin is configured to limit rotation of the wing divider past a selected upward angle relative to the support shaft.

Embodiment 16: An agricultural harvester comprising a chassis, a feederhouse carried by the chassis, a processing system carried by the chassis and structured to receive crop material from the feederhouse, a grain bin carried by the chassis and structured to receive processed grain from the processing system, and a harvesting header coupled to the feederhouse and configured to cut grain. The harvesting header comprises a header frame, a first divider assembly at a first end of the header frame, and a second divider assembly at a second end of the header frame opposite the first end. Each of the first divider assembly and the second divider assembly comprises a fixed divider, a support shaft carried by the fixed divider, a rotatable wing divider coupled to the support shaft at a pivot point, and a torsional biasing element configured to apply a biasing rotational force to the wing divider relative to the support shaft. The harvesting header further comprises at least one harvesting tool carried by the header frame between the first divider assembly and the second divider assembly.

Embodiment 17: The agricultural harvester of Embodiment 16, wherein the harvesting tool comprises at least one oscillating blade.

Embodiment 18: The agricultural harvester of Embodiment 16 or Embodiment 17, wherein the harvesting header further comprises a collecting auger configured to transport crop material to the feederhouse.

Embodiment 19: The agricultural harvester of any one of Embodiment 16 through Embodiment 18, wherein each torsional biasing element comprises an elastomeric material.

Embodiment 20: The agricultural harvester of any one of Embodiment 16 through Embodiment 19, wherein each torsional biasing element is configured to apply the biasing rotational force downward on a respective wing divider.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

What is claimed is:

1. An apparatus for dividing crops, comprising:
   a support shaft configured to be received by a fixed divider of a harvesting header;
   a rotatable wing divider coupled to the support shaft at a pivot point, the wing divider having a stop configured to prevent rotation of the wing divider past a selected downward angle relative to the support shaft, wherein at the selected downward angle, a lower member of the wing divider is collinear with the support shaft; and
   a torsional biasing element configured to apply a biasing rotational force to the wing divider relative to the support shaft.

2. The apparatus of claim 1, wherein the wing divider comprises an upper member, a lower member, and a divider tip secured to the upper member and the lower member.

3. The apparatus of claim 2, wherein the wing divider further comprises a brace and a center support configured to maintain an orientation of the upper member relative to the lower member.

4. The apparatus of claim 3, wherein the wing divider is coupled to the support shaft by the lower member of the wing divider.

5. The apparatus of claim 1, wherein the torsional biasing element pushes the wing divider downward when the wing divider is at an angle above the selected downward angle.

6. The apparatus of claim 1, wherein at least one of the wing divider and the support shaft defines a slot, and further comprising a pin disposed within the slot, wherein rotation of the wing divider causes the pin to slide relative to the slot.

7. The apparatus of claim 6, wherein the pin is configured to limit rotation of the wing divider past a selected upward angle relative to the support shaft.

8. The apparatus of claim 7, wherein the torsional biasing element pushes the wing divider downward from the upward angle.

9. The apparatus of claim 1, wherein the support shaft has a generally straight portion.

10. The apparatus of claim 1, wherein the torsional biasing element comprises an elastomeric material.

11. A harvesting header for use with a crop-harvesting machine, the harvesting header comprising:
a header frame structured to be coupled to the crop-harvesting machine;
a first divider assembly at a first end of the header frame and a second divider assembly at a second end of the header frame opposite the first end, each of the first divider assembly and the second divider assembly comprising:
a fixed divider;
a support shaft carried by the fixed divider;
a rotatable wing divider coupled to the support shaft at a pivot point, the wing divider having a stop configured to prevent rotation of the wing divider past a selected downward angle relative to the support shaft, wherein at the selected downward angle, a lower member of the wing divider is collinear with the support shaft; and
a torsional biasing element configured to apply a biasing rotational force to the wing divider relative to the support shaft; and
at least one harvesting tool carried by the header frame between the first divider assembly and the second divider assembly.

12. The harvesting header of claim 11, wherein each wing divider comprises a stop configured to prevent rotation of the wing divider past a selected downward angle relative to the support shaft.

13. The harvesting header of claim 11, wherein at least one of the wing divider and the support shaft defines a slot, and further comprising a pin disposed within the slot, wherein rotation of the wing divider causes the pin to slide relative to the slot, wherein the pin is configured to limit rotation of the wing divider past a selected upward angle relative to the support shaft.

14. An agricultural harvester, comprising:
a chassis;
a feederhouse carried by the chassis;
a processing system carried by the chassis and structured to receive crop material from the feederhouse;
a grain bin carried by the chassis and structured to receive processed grain from the processing system; and
a harvesting header coupled to the feederhouse and configured to cut grain, the harvesting header comprising:
a header frame;
a first divider assembly at a first end of the header frame and a second divider assembly at a second end of the header frame opposite the first end, each of the first divider assembly and the second divider assembly comprising:
a fixed divider;
a support shaft carried by the fixed divider;
a rotatable wing divider coupled to the support shaft at a pivot point, the wing divider having a stop configured to prevent rotation of the wing divider past a selected downward angle relative to the support shaft, wherein at the selected downward angle, a lower member of the wing divider is collinear with the support shaft; and
a torsional biasing element configured to apply a biasing rotational force to the wing divider relative to the support shaft; and
at least one harvesting tool carried by the header frame between the first divider assembly and the second divider assembly.

15. The agricultural harvester of claim 14, wherein the harvesting tool comprises at least one oscillating blade.

16. The agricultural harvester of claim 14, wherein the harvesting header further comprises a collecting auger configured to transport crop material to the feederhouse.

17. The agricultural harvester of claim 14, wherein each torsional biasing element comprises an elastomeric material.

18. The agricultural harvester of claim 14, wherein each torsional biasing element is configured to apply the biasing rotational force downward on a respective wing divider.

* * * * *